(12) United States Patent
Dunstan (10) Patent No.: US 7,210,045 B2
(45) Date of Patent: Apr. 24, 2007

(54) STORING ENCRYPTED AND/OR COMPRESSED SYSTEM CONTEXT INFORMATION WHEN ENTERING A LOW-POWER STATE

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 10/643,848

(22) Filed: Aug. 19, 2003

(65) Prior Publication Data

US 2005/0044433 A1    Feb. 24, 2005

(51) Int. Cl.
*G06F 1/24* (2006.01)

(52) U.S. Cl. ............... 713/300; 713/320; 713/324; 713/168

(58) Field of Classification Search ......... 713/300, 713/320–324, 168
See application file for complete search history.

(56) References Cited

U.S. PATENT DOCUMENTS

| 4,802,220 A | * | 1/1989 | Marker, Jr. .............. 380/33 |
| 4,866,707 A | * | 9/1989 | Marshall et al. ......... 714/749 |
| 4,897,875 A | * | 1/1990 | Pollard et al. ........... 713/168 |

* cited by examiner

*Primary Examiner*—Thomas R. Peeso
(74) *Attorney, Agent, or Firm*—Buckley, Maschoff & Talwalkar LLC (57) ABSTRACT

According to some embodiments, encrypted and/or compressed system context information is stored when entering a low-power state.

19 Claims, 8 Drawing Sheets

STORING ENCRYPTED AND/OR COMPRESSED SYSTEM CONTEXT INFORMATION WHEN ENTERING A LOW-POWER STATE

BACKGROUND

A system, such as a Personal Computer (PC), may enter a low-power state during a period of relative inactivity. For example, a PC might automatically enter a sleep state when not being used in order to reduce power consumption. As a result, energy can be conserved, the PC may operate more quietly (e.g., because a fan might not need to cool a processor), and/or battery life may be extended.

In some cases, context information may be saved when the system enters the low-power state (e.g., by saving an operating system and memory image to a non-volatile storage device). The context information may then be retrieved when the system returns to a higher-power state. In this way, the system may return to the same state it was in before entering a low-power state (e.g., the same applications may be executing and the same files may be opened).

DETAILED DESCRIPTION

Some embodiments described here are directed to a "system." As used herein, the term "system" may refer to any apparatus that includes one or more processors. Examples of a system include a desktop PC, a mobile system, a workstation, a server, a set top box (e.g., associated with a digital television receiver), and a game system.

Moreover, some embodiments are associated with a "low-power state," which may refer to any state in which a system consumes less power as compared to a higher-power state. For example, the Advanced Configuration and Power Interface (ACPI) Specification Revision 2.0b (October, 2002) defines a number of low-power states, including a number of sleep states.

Figure 1:
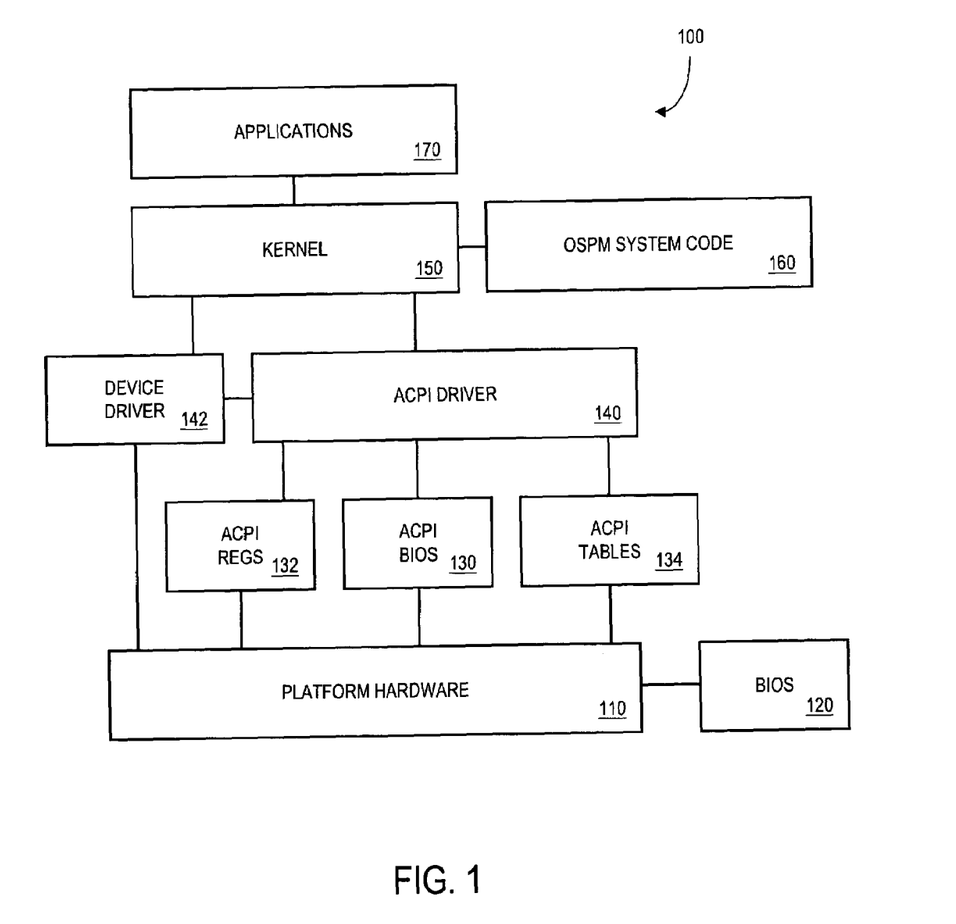
FIG. 1 is a block diagram of hardware and software power management components according to some embodiments.

FIG. 1 is a block diagram of hardware and software power management components that may be associated with an ACPI system 100 according to some embodiments. The system 100 includes platform hardware 110, such as a processor, a motherboard, and related components. The system 100 also includes a Basic Input/Output System (BIOS) 120 that facilitates start-up operations. The platform hardware 110 may exchange information with an ACPI driver 140 via an ACPI BIOS 130, ACPI registers 132, and/or ACPI tables 134 (and these may be part of the BIOS data and contained with the BIOS in the same non-volatile memory element, such as flash memory). The ACPI driver 140 (e.g., an integral part of an operating system) may in turn communicate with an Operating System (OS) kernel 150 and one or more device drivers 142. The kernel 150 may exchange information with OS Power Management (OSPM) code 160 and one or more applications 170 that are executing in the system 100.

To save power, the ACPI system 100 may enter a number of different sleep states during periods of relative inactivity. A sleep state may comprise, for example, a state in which the system 100 consumes an increasingly lower amount of power, application 170 instructions are not being executed by a processor in the platform hardware 110 (e.g., ACPI states S1 or S2), and/or the system 100 may appear to be "turned off" to a user.

In some sleep states, context information associated with the ACPI system 100 may be saved. For example, when the system enters ACPI state S3, also referred to as "suspend to Random Access Memory (RAM)," the OS saves context information to a volatile storage device (e.g., to system RAM). When the system enters ACPI state S4, also referred to as "suspend to disk" or "hibernate," context information may be stored to a non-volatile storage device (e.g., to any device that retains information even when external power is not supplied to the device). In ACPI state S5, no context information is retained.

Figure 2:
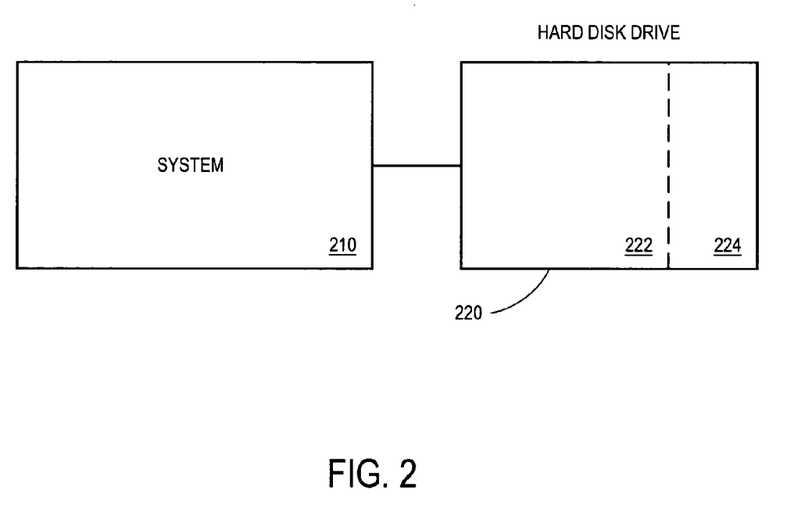
FIG. 2 is a block diagram including a system and a hard disk drive according to some embodiments.

For example, FIG. 2 is a block diagram including a system 210 and a hard disk drive 220 according to some embodiments. The hard disk drive 220 is divided such that it includes a normal partition 222 and a hidden partition 224. Although a hard disk drive 220 is illustrated in FIG. 2, any non-volatile storage device might be included instead of, or in addition to, the hard disk drive 220. For example, a flash memory unit, a Random Access Memory (RAM) unit having a battery, and/or a network device might be used.

To save power, the system 210 enters a sleep state when it is not executing instructions (e.g., the system 210 might enter ACPI state S3 or S4). Moreover, when the system 210 enters ACPI state S4, context information associated with the system 210 is saved to the disk drive 220 (e.g., by the OS writing information to a file immediately before entering the sleep state). For example, the context information might be written to the hidden partition 224 or some other reserved area of the hard disk drive 220. The context information can then be retrieved from the disk drive 220 when the operating system exits the sleep state. In this way, the system 210 may return to the same state it was in before entering the sleep state (e.g., the same applications may be executing and the same files may be opened).

Because the hard disk drive 220 is a non-volatile storage device, however, confidential information may be inadvertently exposed. Consider, for example, the case where context information is stored to the hidden partition 224 of the hard disk drive 220. In this case, the context information may still be present on the hard disk drive 220 even after the normal partition 222 is erased. As a result, confidential information contained in the context information (e.g., a password, a credit card number, or a Social Security number) could be accidentally be revealed to someone who subsequently has access to the hard disk drive 220.

Figure 3:
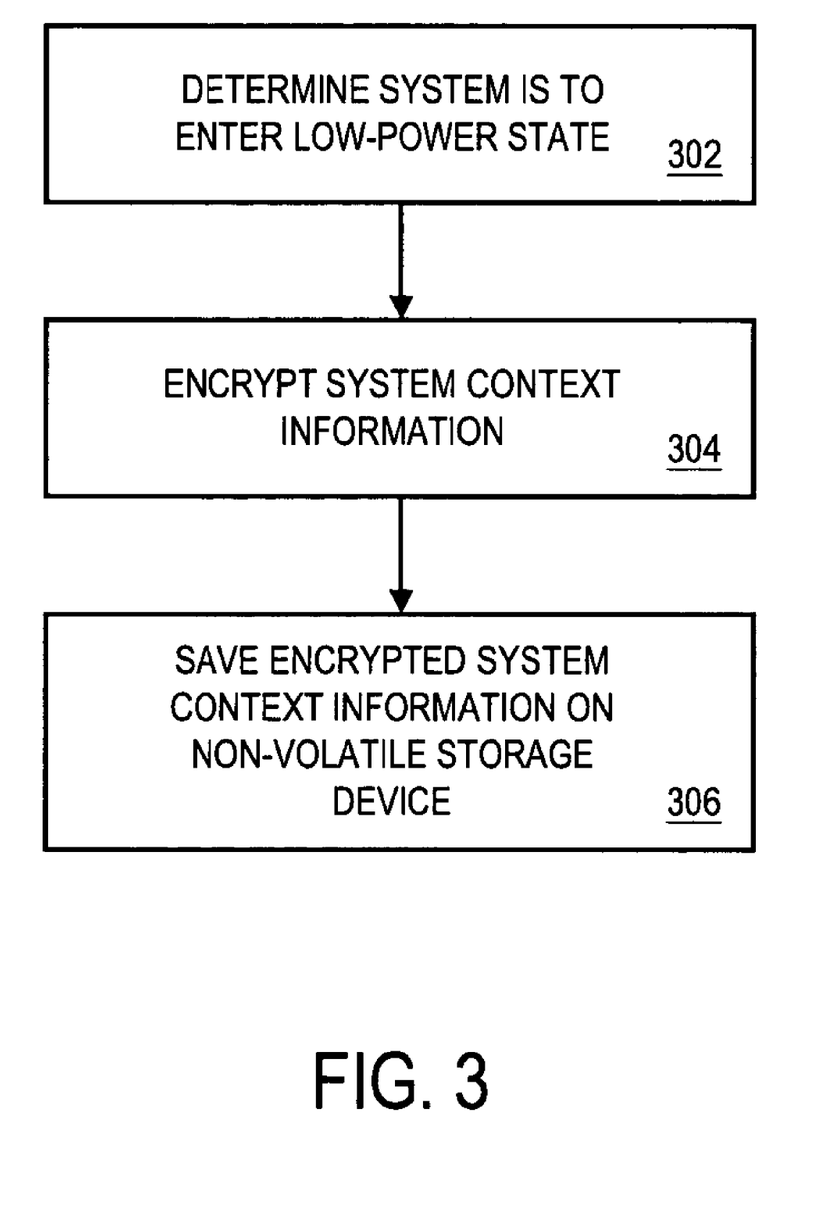
FIG. 3 is a flow chart of a method according to some embodiments.

FIG. 3 is a flow chart of a method according to some embodiments. The flow charts described herein do not necessarily imply a fixed order to the actions, and embodiments may be performed in any order that is practicable. The method of FIG. 3 may be associated with, for example, a system such as the ones described with respect to FIGS. 1 and/or 2. Note that any of the methods described herein may be performed by hardware, software (including microcode), or a combination of hardware and software. For example, a storage medium may store thereon instructions that when executed by a machine results in performance according to any of the embodiments described herein.

At 302, it is determined that a system is to enter a low-power state. The determination may be based on, for example, a current system workload or a power failure. The determination may also be based on a user action. For example, a period of user inactivity might cause the system to enter the low-power state. Similarly, a user may activate a button on a PC's case or keyboard to cause the system to enter the low-power state. The low-power state might be associated with, for example, an ACPI S3 or S4 sleep state.

At 304, system context information is encrypted. According to one embodiment, the system context information is encrypted before being saved directly to non-volatile memory (e.g., when the system enters state S4). According to another embodiment, the system initially enters state S3 (and the OS writes the system context information to volatile storage, such as system RAM). The BIOS may then arrange for the information stored in system RAM to be encrypted before being saved to a non-volatile storage device, such as a hard disk drive. This might be the case, for example, when the BIOS arranges for the system to enter a modified S3 sleep state ("S3P") as described with respect to FIG. 7.

The system context information may include, for example, an OS and/or memory image. The encryption process may be performed, for example, in accordance with Data Encryption Standard (DES) defined by American National Standards Institute (ANSI) X3.92 "American National Standard for Data Encryption Algorithm (DEA)" (1981), triple-DES as defined by ANSI X9.52 "Triple Data Encryption Algorithm Modes of Operation" (1998), or Advanced Encryption Standard (AES) as defined by Federal Information Processing Standards (FIPS) publication 197 (2002). Details about these, and other, encryption processes can be found in Bruce Schneier, "Applied Cryptography" (2nd Ed., 1996).

The encryption process might also be associated with an encryption key that is used to encrypt (and decrypt) the system context information. The encryption key could be based on, or associated with, a system, a user, and/or a processor identifier. According to some embodiments, the encryption key is associated with a Trusted Platform Module (TPM) implementation of the Trusted Computing Platform Alliance Specification 1.1b (2000).

The encrypted system context information is then saved on a non-volatile storage device at 306 (e.g., the OS may store the information or the BIOS may arrange for the information to be stored). Because the system context information has been encrypted before being saved, it may be more difficult for someone who subsequently has access to the non-volatile storage device to obtain confidential information.

Figure 4:
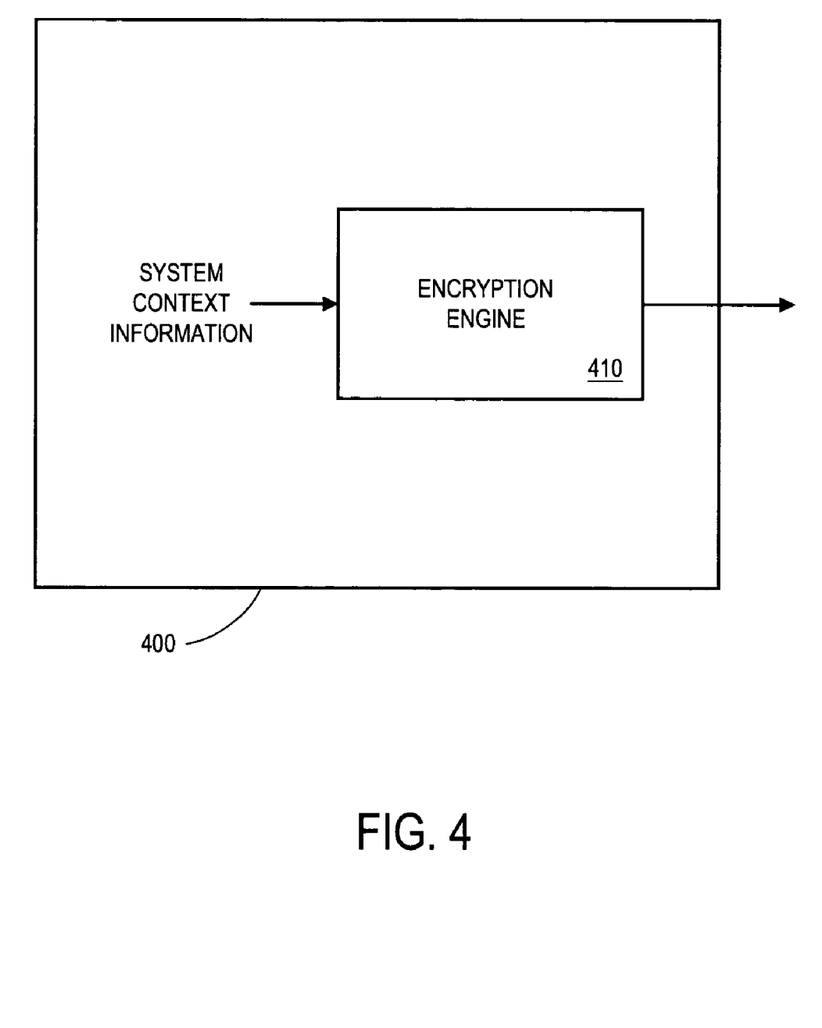
FIG. 4 is a block diagram of an apparatus according to some embodiments.

FIG. 4 is a block diagram of an apparatus 400 according to some embodiments. The apparatus 400 includes an encryption engine 410 that may be used to encrypt system context information before it is saved (e.g., to a hard disk drive). The encryption engine 410 may be, for example, a software unit or a hardware device adapted to encrypt a stream of information. Note that the system 400 may further include a decryption engine (not illustrated in FIG. 4) to decrypt the encrypted system context information after it is retrieved (e.g., when the system is ready to return to a higher-power state).

Figure 5:
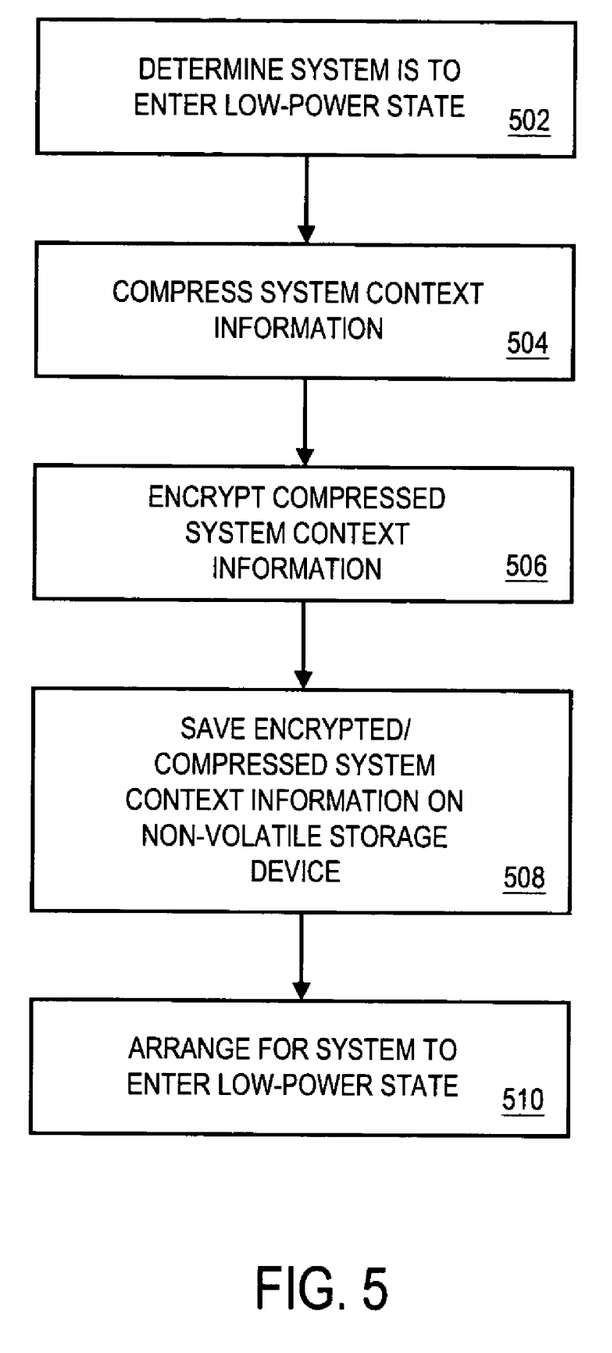
FIG. 5 is a flow chart of a method that includes compression according to some embodiments.

The amount of system context information that is needed to appropriately return to a higher-power state can be relatively large (whether or not is has been encrypted). As a result, it may take a significant amount of storage space and time to save and/or retrieve the information (e.g., several gigabytes of information might need to be saved to or retrieved from a hard disk drive). Moreover, in some cases the system context information might be saved to non-volatile memory because of a system power failure (e.g., the power failure might have triggered a transition to a low-power state). As a result, the maximum amount of information that can be saved might be limited by the amount of power available from a back-up power source. To reduce the amount of information that needs to be saved, FIG. 5 is a flow chart of a method that includes compression according to some embodiments.

As before, it is determined that a system is to enter a low-power state at 502 (e.g., it may be determined that the system will enter an ACPI S3 or S4 sleep state based on a current system workload, a user action, and/or a power failure).

At 504, system context information is compressed. For example, a software or hardware unit may use a compression algorithm to reduce the amount of system context information. As before, the system context information might be compressed before being saved directly to non-volatile memory (e.g., when the system enters state S4). According to another embodiment, the system initially enters state S3 (and the OS writes the system context information to volatile storage, such as system RAM). The BIOS may then arrange for the information stored in system RAM to be compressed before being stored on a non-volatile storage device, such as a hard disk drive.

At 506, the compressed system context information is encrypted (e.g., the BIOS might arrange for the compressed system context information to be encrypted). Note that according to other embodiments, no encryption is performed on the compressed system context information.

The encrypted and compressed system context information is then saved on a non-volatile storage device at 508. Because the system context information has been compressed before being saved, the amount of storage space and time required to save the information may be reduced (and, as a result, the amount of power that needs to be available from a back-up power source may be reduced).

At 510, it is arranged for the system to enter the low-power state (e.g., an ACPI process or device may arrange for the system to enter the S3 or S4 sleep state).

Figure 6:
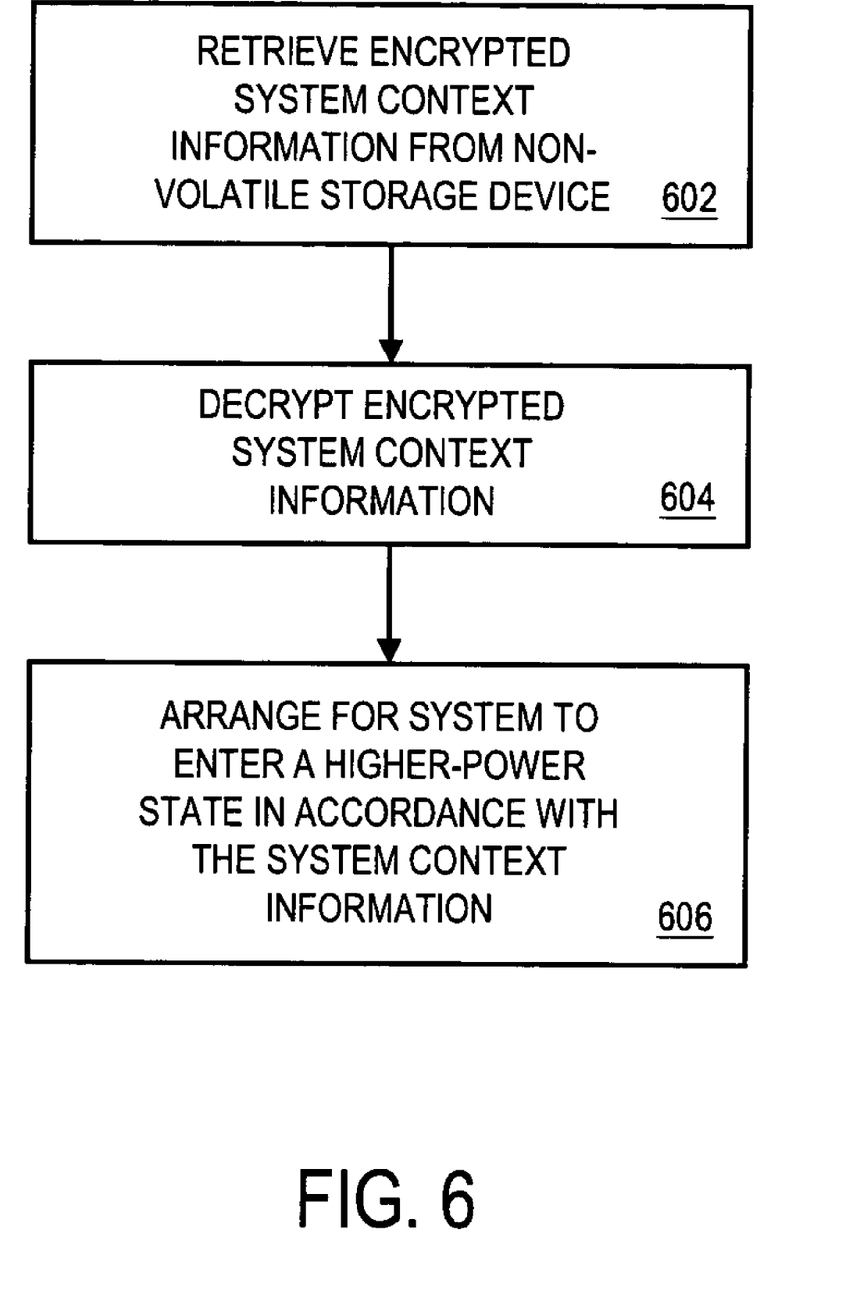
FIG. 6 is a flow chart of a method of returning to a higher-power state according to some embodiments.

After the system enters the low-power state, it may be determined that system should return to a higher-power state. Such a determination may be based on, for example, a current system workload, a user action (e.g., a user may activate a button on a PC's case or keyboard), and/or a return of power. FIG. 6 is a flow chart of a method of returning to the higher-power state according to some embodiments.

At 602, encrypted system context information is retrieved from a non-volatile storage device (e.g., from a partition on a hard disk drive). At 604, the encrypted system context information is decrypted (e.g., using any of the processes, devices, and/or keys as described with respect to the encryption process). Note that according to some embodiments, the system context information may also be de-compressed.

At 606, it is arranged for the system to enter the higher-power state in accordance with the system context information. For example, the system may return to the same state it was in before entering the low-power state (e.g., the same applications may be executing and the same files may be opened).

Figure 7:
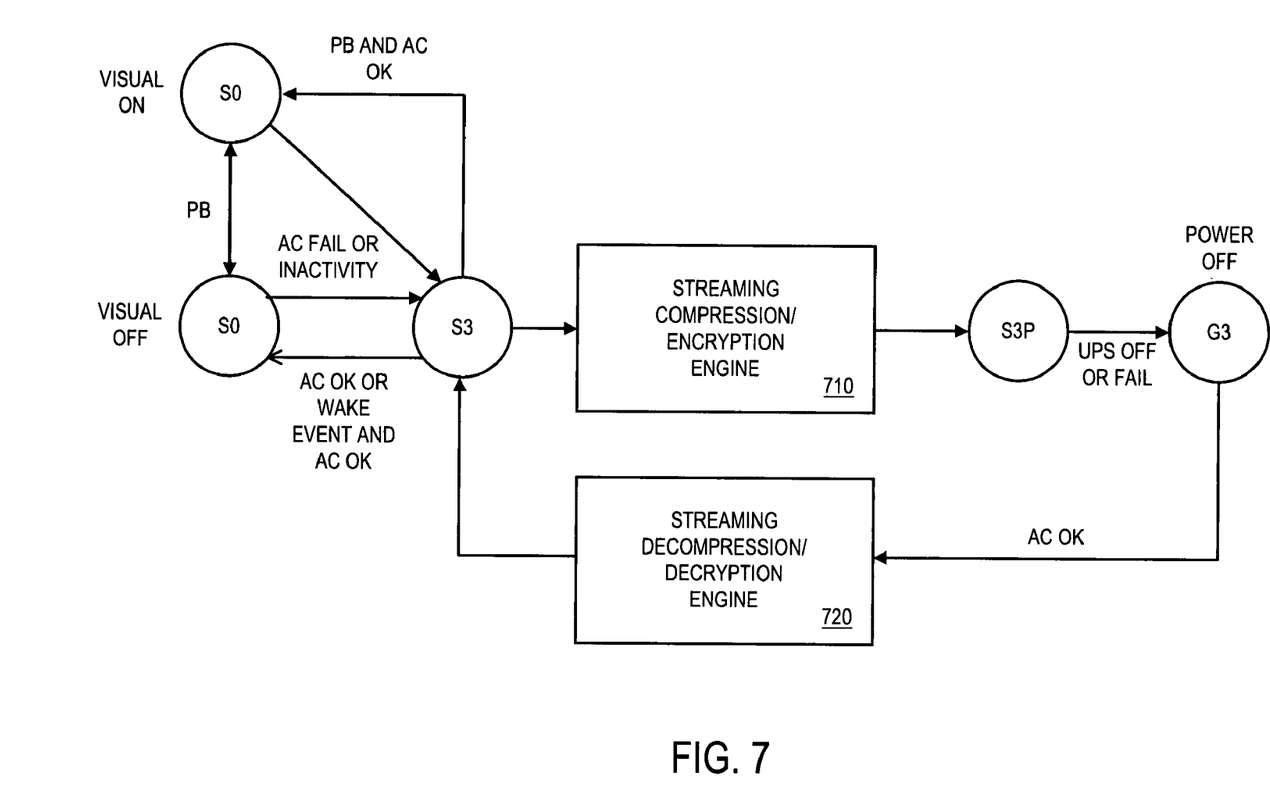
FIG. 7 illustrates one example of power state transitions.

FIG. 7 illustrates one example of power state transitions. Note that in this example, there two versions of an ACPI non-sleep state (S0). In either case, the system may dispatch and execute application instructions and respond to external events in substantially real time.

When the system is in a "visual on" version of the non-sleep state, a display monitor may be on and the system may operate in a normal manner. A user may then activate a pushbutton (PB) to transition the system to a "visual off" version of the non-sleep state. While in visual off, the display monitor may be turned off and certain processing associated with the display might be reduced (e.g., so that a fan associated with a graphics card does not need to remain on). Note that the system may still execute instructions in visual off (e.g., to arrange for a digital television signal to be recorded or to provide MP3 files to a remote stereo device). The user can then re-activate the pushbutton to return to visual on.

An Alternating Current (AC) power failure or user inactivity for a period of time (e.g., if the user does not press a key on a keyboard or move a mouse for ten minutes) causes the system to enter an ACPI S3 sleep state. When entering the S3 sleep state, an OS may notify applications and drivers that are currently executing (e.g., so that appropriate actions can be taken to prepare for the transition) and arrange for system context information to be stored in volatile memory. Because the system context information is stored in volatile memory, the latency associated with a return to S0 may be reduced as compared to an S4 sleep state (e.g., because the system context information may be retrieved from volatile memory more quickly as compared to non-volatile memory). An activation of a pushbutton by a user, a return of AC power, and/or a wake event (e.g., an event that occurs when a pre-determined condition is met) causes the system to return to visual on or off as appropriate.

When it is determined that the system has entered the S3 sleep state (e.g., based on information the OS writes into an ACPI register), a BIOS may arrange for some or all of the system context information in volatile memory to be encrypted and/or compressed by a streaming engine 710 and saved to non-volatile memory. When the save is complete, the system can be considered to be in a "persistent" version of the ACPI S3 sleep mode (S3P). Note that the OS and applications executing on the system may not be aware that the system has transitioned from the S3 to the S3P sleep state. Also note that the BIOS may not have same knowledge about memory usage as compared to the OS and, as a result, compression might be beneficial if the BIOS needs to copy an entire memory image when entering S3P. In the event of an Uninterruptible Power Supply (UPS) being turned off or failing, the system may enter an ACPI G3 not-powered state.

Upon a return of AC power, the BIOS arranges for the encrypted system context information from nonvolatile memory to be decrypted and/or decompressed by a streaming engine 720 and stored in volatile memory. The system is once again, therefore, in an ACPI S3 sleep state and the system context information in volatile memory may be used to return to a non-sleep state (e.g., without the OS or applications being aware that either the S3P or G3 states had been entered). Although FIG. 7 uses an AC power failure to illustrate a trigger event that results in a transition to the S3P state, other types of events could also trigger the S3P state.

Figure 8:
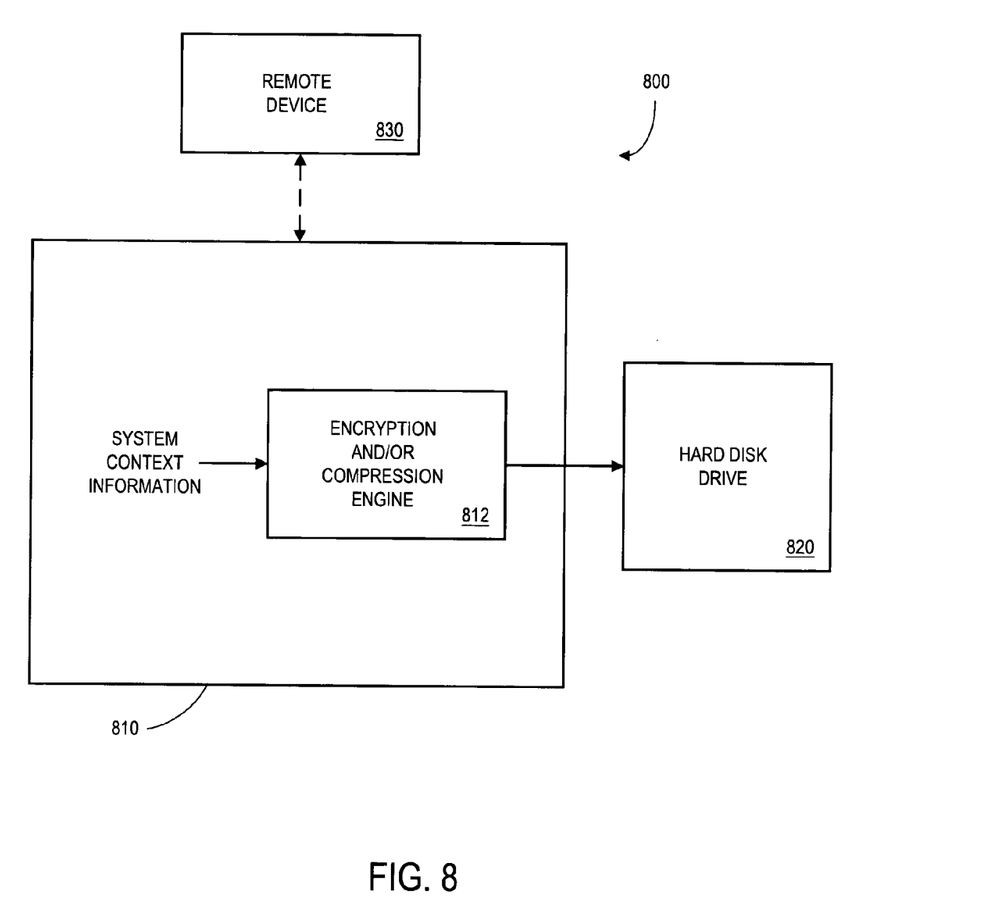
FIG. 8 illustrates a computer system according to some embodiments.

FIG. 8 illustrates a computer system 800 according to some embodiments. The computer system 800 includes an apparatus 810 that may be in a low-power or higher-power state, such as an ACPI PC. The apparatus 810 further includes an encryption and/or compression engine 812 that may encrypt and/or compress system context information before it is saved on a hard disk drive 820. According to other embodiments, the apparatus 810 instead saves the encrypted system context information on another type of non-volatile storage device. Note that the apparatus 810 may further include a decryption and/or de-compression engine (not shown in FIG. 8) to decrypt and/or de-compress system context information retrieved from the hard disk drive 820. The apparatus 810 may further communicate with one or more remote devices 830 (e.g., a television decoder or stereo device) through a network.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although specific types of system context information and power states have been described herein, embodiments may be associated with any type of context information and/or power state.

Moreover, some embodiments described herein have been associated with system context information that is saved on a non-volatile storage device. Some embodiments, however, may also be associated with a volatile storage device. For example, system context information might be compressed before being saved to a volatile storage device (e.g., when entering an ACPI S3 sleep state) to reduce the space and time required to save the information.

According to some embodiments, the encryption and/or compression of system context information may be configurable by user. For example, a user in a home environment may decide to reduce the latency of low-power state transitions by not implementing the encryption process (e.g., because he or she is not concerned about confidential information or does not expect anyone else to have access to the PC's hard disk drive). A user in a corporate environment, on the other hand, might decide that the enhanced security provided by the encryption process is worth a latency increase.

The several embodiments described herein are solely for the purpose of illustration. Persons skilled in the art will recognize from this description other embodiments may be practiced with modifications and alterations limited only by the claims.

What is claimed is:

1. A method, comprising:
    determining that a system is to enter a low-power state;
    encrypting system context information; and
    saving the encrypted system context information on a non-volatile storage device, wherein the system context information is associated with at least one of: (i) an operating system image, or (ii) a memory image.

2. A method, comprising:
    determining that a system is to enter a low-power state;
    encrypting system context information; and
    saving the encrypted system context information on a non-volatile storage device, wherein the low-power state is associated with an advanced configuration and power interface sleep state.

3. A method, comprising:
determining that a system is to enter a low-power state;
encrypting system context information; and
saving the encrypted system context information on a non-volatile storage device, wherein the non-volatile storage device comprises at least one of: (i) a hard disk drive, (ii) a hard disk drive partition, (iii) a flash memory unit, (iv) a random access memory having a battery, or (v) a network device.

4. A method, comprising:
determining that a system is to enter a low-power state;
encrypting system context information; and
saving the encrypted system context information on a non-volatile storage device, wherein the system includes a processor and comprises at least one of: (i) a desktop personal computer; (ii) a mobile system, (iii) a workstation, (iv) a server, (v) a set top box, or (vi) a game system.

5. A method, comprising:
determining that a system is to enter a low-power state;
encrypting system context information; and
saving the encrypted system context information on a non-volatile storage device, wherein said encrypting is performed in accordance with at least one of: (i) a system identifier, (ii) a user identifier, (iii) a processor identifier, or (iv) trusted platform module information.

6. The method of claim 5, wherein said encrypting is performed by at least one of: (i) a software application, (ii) a hardware device, or (iii) a stream encryption engine.

7. A method, comprising:
determining that a system is to enter a low-power state;
encrypting system context information; and
saving the encrypted system context information on a non-volatile storage device, wherein an operating system writes the system context information into a volatile memory device and said encrypting and saving are arranged by another device that accesses the system context information from the volatile memory device, wherein the other device is associated with at least one of: (i) a basic input/output system, or (ii) an encryption engine associated with a chipset.

8. A method, comprising:
determining that a system has entered an advanced configuration and power interface S3 sleep state; and
arranging for system context information stored in volatile memory to be encrypted and saved in a non-volatile storage device.

9. The method of claim 8, further comprising:
arranging for the system context information to be compressed before being encrypted.

10. An apparatus, comprising:
a decision unit to determine that a system is to enter a low-power state; and
an encryption engine to encrypt system context information and arrange for the encrypted system context information to be saved on a non-volatile storage device, wherein the system context information is associated with at least one of: (i) an operating system image, or (ii) a memory image.

11. The apparatus of claim 10, further comprising:
a compression engine to compress the system context information before it is encrypted.

12. An apparatus, comprising:
a storage medium having stored thereon instructions that when executed by a machine result in the following:
determining that a system is to enter a low-power state,
encrypting system context information, and
saving the encrypted system context information on a non-volatile storage device, wherein the system context information is associated with at least one of: (i) an operating system image, or (ii) a memory image.

13. The apparatus of claim 12, wherein execution of the instructions further results in:
compressing the system context information before it is encrypted.

14. A method, comprising:
determining that a system is to enter a low-power state;
compressing system context information; and
saving the compressed system context information on storage device, wherein the system context information is associated with at least one of: (i) an operating system image, or (ii) a memory image.

15. The method of claim 14, wherein the compressed system context information is saved to a non-volatile storage device.

16. The method of claim 14, further comprising:
arranging for the system to enter the low-power state after the compressed system context information is saved.

17. The method of claim 14, further comprising:
retrieving the compressed system context information;
uncompressing the compressed system context information; and
arranging for the system to enter a higher-power state in accordance with the system context information.

18. A computer system, comprising:
a hard disk drive; and
an apparatus, including:
a decision unit to determine that a system is to enter a low-power state, and
an encryption engine to encrypt system context information and arrange for the encrypted system context information to be saved on a non-volatile storage device, wherein the system context information is associated with at least one of: (i) an operating system image, or (ii) a memory image.

19. The computer system of claim 18, wherein the apparatus further comprises:
a compression engine to compress the system context information before it is encrypted.

* * * * *